United States Patent
Miwa et al.

(10) Patent No.: US 6,814,453 B2
(45) Date of Patent: Nov. 9, 2004

(54) LOW-COST REFLECTOR WITH EXCELLENT HEAT RESISTANCE

(75) Inventors: Yoshiharu Miwa, Oumihachiman (JP); Toshimasa Kanai, Kanzaki-gun (JP)

(73) Assignee: Nippon Electric Glass Co., Ltd., Otsu (JP)

(*) Notice: Subject to any disclaimer, the term of this patent is extended or adjusted under 35 U.S.C. 154(b) by 0 days.

(21) Appl. No.: 10/228,497

(22) Filed: Aug. 27, 2002

(65) Prior Publication Data

US 2003/0048553 A1 Mar. 13, 2003

(30) Foreign Application Priority Data

| Aug. 28, 2001 | (JP) | ................................. | 2001-258097 |
| Oct. 29, 2001 | (JP) | ................................. | 2001-330106 |
| Apr. 8, 2002 | (JP) | ................................. | 2002-105220 |
| Apr. 8, 2002 | (JP) | ................................. | 2002-105223 |
| May 7, 2002 | (JP) | ................................. | 2002-131784 |

(51) Int. Cl.[7] ................................. G02B 5/10
(52) U.S. Cl. ........................ 359/853; 359/867
(58) Field of Search ............... 359/838, 867, 359/870, 829, 814, 853

(56) References Cited

U.S. PATENT DOCUMENTS

| 4,091,951 A | | 5/1978 | Zijlstra et al. |
| 4,192,689 A | * | 3/1980 | Rinehart ................... 501/70 |
| 5,003,435 A | * | 3/1991 | Nakata ................... 362/518 |
| 5,921,667 A | | 7/1999 | Raby, Sr. et al. |
| 6,382,816 B1 | | 5/2002 | Zhao et al. |

FOREIGN PATENT DOCUMENTS

| EP | 1096197 | 5/2001 | |
| JP | 9-55109 | 2/1997 | |
| JP | 9-197124 A | * 7/1997 | ............ G02B/5/28 |

* cited by examiner

Primary Examiner—Euncha P. Cherry
(74) Attorney, Agent, or Firm—Collard & Roe, P.C.

(57) ABSTRACT

In a reflector (10) including a mirror base member (11) having a concave surface, a reflecting film (12) is formed on the concave surface. For preventing the fragments of the broken lamp from flying forward, a protective glass plate (13) is attached to the mirror base member. At least one of the mirror base member and the protective glass plate is made of a glass member whose mechanical strength is enhanced. The mechanical strength of the glass member may be enhanced by ion exchange.

18 Claims, 3 Drawing Sheets

LOW-COST REFLECTOR WITH EXCELLENT HEAT RESISTANCE

BACKGROUND OF THE INVENTION

The present invention relates to a reflector for a light source lamp that is usable in a projecting device, such as a liquid crystal projector, an overhead projector or a motion picture projector, a lighting device for obtaining general illumination, spotlight or the like, or other devices.

As a mirror base member of a reflector for use in a projecting or lighting device, there has been used a glass member having, on its front side, a concave surface forming a paraboloid of revolution or an ellipsoid of revolution. On the concave surface of the mirror base member, a multilayer reflecting film (e.g. a multilayer film formed by stacking $SiO_2$ films and $TiO_2$ films alternately in 25 to 50 layers) is formed by sputtering or vacuum deposition. In this fashion, the reflector having a concave reflecting surface has been produced. Incidentally, a mounting hole is formed at the center of the mirror base member for mounting a light source lamp.

It is possible that the light source lamp bursts up due to an occurrence of stress concentration caused by long-term use or due to abnormal electric discharge. In view of this, the front side of the reflector is sealed by a protective glass plate. This prevents, even when the light source lamp bursts up, fragments of the broken lamp from flying forward.

Because such a projecting or lighting device requires strong visible light, an extra-high pressure mercury lamp, an arc metal halide lamp, a halogen lamp or the like has been used as the light source lamp. The light source lamp of this type radiates infrared light in addition to visible light, so that the mirror base member and protective glass plate of the reflector are heated.

Therefore, it is required that the mirror base member and protective glass plate of the reflector have excellent heat resistance and excellent heat/impact resistance. For the mirror base member of the reflector, low-expansive borosilicate glass or crystallized glass has been used, while low-expansive borosilicate glass has been used for the protective glass plate of the reflector. However, when heated over a long term, a stress is generated in the mirror base member so that even a slight impact causes cracks, leading to exfoliation of the multilayer reflecting film, and according to circumstances, leading to breakage of the mirror base member.

In view of this, there has been proposed a reflector in JP-A-9-55109, wherein a plurality of radiation fins are provided on the back side of a mirror base member opposite from a concave surface thereof. However, providing the radiation fins on the outer surface of the mirror base member makes difficult the formation thereof, leading to low yield and increased cost.

If the light source lamp is designed to have higher intensity, i.e. higher wattage, to make a projected image brighter, the calorific value of the light source lamp increases following it. In this event, sufficient heat radiation can not be achieved only by providing the radiation fins on the back side of the mirror base member, thus leading to a possibility of generation of cracks and breakage of the mirror base member. Further, the internal pressure of the light source lamp increases and, following this, the frequency in bursts of such light source lamps increases and, simultaneously, the impact upon such burst also increases. As a result, it is possible that the conventional protective glass plate made of borosilicate glass is broken due to fragments upon burst of the light source lamp, and thus can not sufficiently function as the protective glass plate.

On the other hand, the thickness of the conventional protective glass plate is set to approximately 5 mm. In this regard, an attempt has been made to prevent the breakage of the protective glass plate by increasing the thickness thereof or by using a plurality of protective glass plates. However, these countermeasures increase the weight and size of the projecting or lighting device, and thus are not practical.

SUMMARY OF THE INVENTION

It is therefore an object of the present invention to provide a reflector that is excellent in heat resistance and can be produced at a low cost.

It is another object of the present invention to provide a reflector that is reluctant to generate a crack or breakage thereof even when heated over a long term by a light source lamp with a large calorific value.

Other objects of the present invention will become clear as the description proceeds.

According to an aspect of the present invention, there is provided a reflector which comprises a mirror base member having a concave surface, a reflecting film formed on the concave surface, and a protective glass plate attached to the mirror base member for preventing the fragments of the broken lamp from flying forward, at least one of the mirror base member and the protective glass plate being made of a glass member whose mechanical strength is enhanced.

According to another aspect of the present invention, there is provided a reflector which comprises a mirror base member having a concave surface and a reflecting film formed on the concave surface, the mirror base member being made of a glass member and having a back side which faces opposite the concave surface and is formed in a concavo-convex fashion.

DESCRIPTION OF THE PREFERRED EMBODIMENTS

Figure 1:
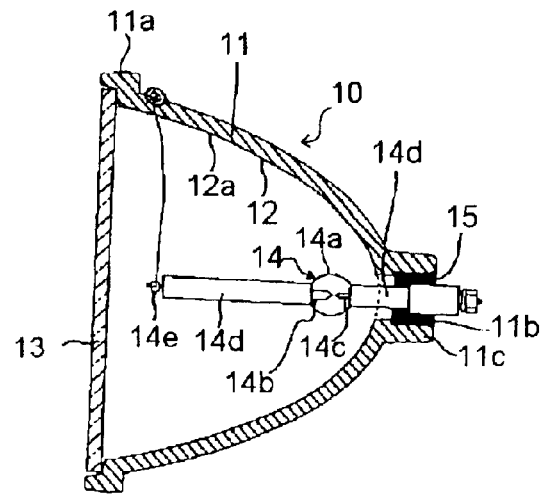
FIG. 1 is a schematic sectional view of a light source device provided with a reflector according to one embodiment of the present invention.

Referring first to FIG. 1, a light source device having a reflector according to one embodiment of the present invention will be described.

In the shown light source device, a reflector 10 comprises a mirror base member 11 shaped to have a concave surface as a smoothly curved surface on its front side, a reflecting film 12 formed on the concave surface in a multilayer fashion to define a concave reflecting surface 12a in the form of a paraboloid of revolution, and a protective glass plate 13 attached to an outermost portion 11a of the mirror base member 11 defining a rectangular opening, thereby to close the rectangular opening. The mirror base member 11 is provided on its back side with a support tubular portion 11c defining therein a lamp mounting hole 11b.

In the lamp mounting hole 11b, a short arc type high pressure mercury discharge lamp 14 is mounted as a light source lamp. The high pressure mercury discharge lamp 14 has an approximately spherical discharge case 14a made of quartz glass. Inside the discharge case 14a, a pair of electrodes, i.e. an anode 14b and a cathode 14c, are disposed confronting each other. Further, mercury and rare gas are filled in the discharge case 14a.

At both ends of the discharge case 14a, sealing portions 14d are integrally joined. The sealing portions 14d are formed by a shrink seal method, wherein quartz glass pipe bodies extending from both ends of the discharge case 14a are rendered into a molten state and then the inside thereof is subjected to pressure reduction. Inside the sealing portions 14d, molybdenum foils (not shown) are buried for electrically connecting the electrodes 14b and 14c to external leads 14e, respectively.

The polarity of the anode 14b and cathode 14c of dc lighting type may be reverse to what is shown in FIG. 1, or further, it may be of ac lighting type. Moreover, the sealing portions 14d may be formed by a pinch seal method, wherein quartz glass pipe bodies are rendered into a molten state and then squeezed.

In the high pressure mercury discharge lamp 14, the filling amount of mercury is 0.2 mg/mm$^3$, and argon gas as rare gas is filled in under pressure of 10 kPa. A distance between the electrodes is 1.5 mm, a capacity of the discharge case 14a is 260 mm$^3$, a rated voltage is 82V, and a rated power consumption is 200 W. For using the short arc type high pressure mercury discharge lamp 14 as a lamp of a liquid crystal projector, no less than 0.16 mg/mm$^3$ of mercury is required to be filled in.

The high pressure mercury discharge lamp 14 is fixed to the mirror base member 11 by adhesive 15 filled in the support tubular portion 11c such that an axis of the lamp 14 coincides with an optical axis of the mirror base member 11, and further, an arc luminescent spot formed between the electrodes 14b and 14c upon lighting is located at the first focus of the mirror base member 11. The protective glass plate 13 is fixed to the outermost portion 11a of the mirror base member 11 by glass frit (not shown) of a low melting point, thereby to seal the rectangular opening of the mirror base member 11.

In the foregoing reflector 10, at least one of the mirror base member 11 and the protective glass plate 13 is made of a glass member whose mechanical strength has been enhanced by ion exchange. As a result, even if the calorific value of the light source lamp 14 is increased and the reflector 10 is heated over a long term with such a light source lamp, a crack or breakage of the reflector 10 is reluctant to occur. Further, by enhancing the mechanical strength of the glass member, the thickness thereof can be reduced to achieve reduction in weight and size of the device. Moreover, when the mechanical strength of the glass member is enhanced by ion exchange, the enhanced mechanical strength is exhibited not only at ordinary temperatures but also at high temperatures. Further, because the heat/impact resistance is also improved by ion exchange, the reflector 10 is reluctant to be broken even if it is exposed to a rapid change in temperature.

As methods of ion exchange, there have been known a low temperature type ion exchange method, a high temperature type ion exchange method, a surface crystallization method and the like, but the best is the low temperature type ion exchange method that hardly causes deformation of glass upon ion exchange. The low temperature type ion exchange method is a method wherein glass is immersed in a chemical strengthening solution, and alkali metal ions in the glass are replaced with alkali metal ions having a larger ion radius, so that a strong compressive stress is generated in a surface layer of the glass due to an increase in volume of ion exchange portions, thereby to strengthen the glass surface.

As a chemical strengthening solution to be used in ion exchange, a molten salt of, for example, potassium nitrate ($KNO_3$), sodium nitrate ($NaNO_3$) or potassium carbonate ($K_2CO_3$), a molten salt of a mixture thereof (i.e. $KNO_3$+$NaNO_3$, $KNO_3$+$K_2CO_3$), a molten salt of a mixture of each of those salts and a salt of ion of, for example, Cu, Ag, Rb or Cs, or the like can be used. During the ion exchange, the temperature is set to about 300 to 600° C., and the heating time is set to several hours to several tens of hours.

Figure 2A:
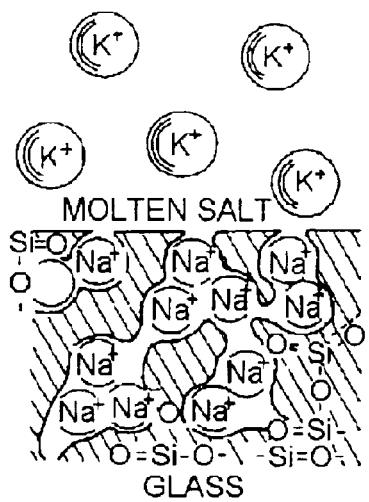
FIGS. 2A and 2B are diagrams for explaining an ion exchange technique to be used for producing the reflector shown in FIG. 1.
Figure 2B:
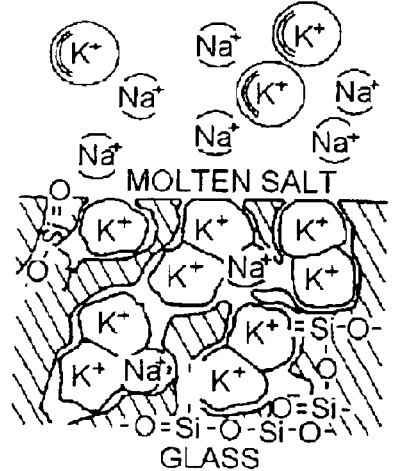

Referring now to FIGS. 2A and 2B, the principle of the foregoing ion exchange will be described. FIG. 2A shows the state before the ion exchange, while FIG. 2B shows the state after the ion exchange.

For performing the ion exchange, a glass member is immersed for a predetermined time in a molten salt in an ion exchange tub held to a temperature lower than an annealing point of glass, and alkali metal ions (Li, Na) in the glass are replaced with alkali metal ions having a greater ion radius (Li is replaced with Na and/or K, and Na is replaced with K). By such ion exchange, the strong compressive stress is generated in the glass surface to enhance the practical strength.

The ion exchange method has advantages such that a strength twice or more as much as that obtained by, for example, a heat tempered method being a kind of physical strengthening method can be attained, there is no limitation in terms of shape or thickness, the high dimensional accuracy can be achieved because no deformation occurs, post-processing can be carried out, and a disfigurement is reluctant to occur.

Preferably, the glass member has a thermal expansion coefficient of $5 \times 10^{-7}$ to $60 \times 10^{-7}$/° C. in a temperature range of 30 to 380° C. In this event, the excellent heat/impact resistance can be obtained with less film exfolication. Specifically, if the thermal expansion coefficient is smaller than $5 \times 10^{-7}$/° C., a difference from a thermal expansion coefficient of an antireflection film becomes large so that the film exfolication is liable to occur. On the other hand, if the thermal expansion coefficient is greater than $60 \times 10^{-7}$/° C., the heat/impact resistance can not be increased sufficiently even by execution of the ion exchange, so that the glass member is liable to break when exposed to a rapid temperature change. Preferably, the thermal expansion coefficient falls within a range of $20 \times 10^{-7}$ to $50 \times 10^{-7}$/° C., and more preferably, within a range of $30 \times 10^{-7}$ to $48 \times 10^{-7}$/° C.

The reflecting film 12 is formed on the concave surface of the mirror base member 11 in a multilayer fashion. Thus, light radiated from the light source lamp 14 is efficiently reflected forward so that a high-intensity projecting or lighting device can be obtained. This multilayer reflecting film 12 also functions to suppress lowering of the strength of the ion-exchanged glass member. For example, if the ion-exchanged glass member is exposed at high temperatures over a long term, alkali metal ions in the glass are gradually replaced with water in the air, so that the mechanical strength of the glass member tends to be lowered. On the other hand, if the multilayer reflecting film is formed on the surface of the glass member, it will serve as a barrier layer to prevent an occurrence of replacement between alkali metal ions in the glass and water in the air, so that the lowering of the mechanical strength can be prevented.

A multilayer film that is formed by stacking high refractive index films and low refractive index films alternately in 25 to 50 layers and that has a thermal expansion coefficient of $30 \times 10^{-7}$ to $50 \times 10^{-7}/°$ C. in a temperature range of 30 to 380° C. is suitable as a reflecting film. As a high refractive index film, a film of $TiO_2$, $Ta_2O_5$, $Nb_2O_5$ or the like is suitable. As a low refractive index film, a film of $SiO_2$, $MgF_2$ or the like is suitable. A film in the form of alternate layers of $TiO_2$ and $SiO_2$ is desirable because it is excellent in film formability and heat resistance, and in addition, it is low-cost. As a film forming method, sputtering or vacuum deposition can be used.

Preferably, the mirror base member 11 is made of glass having a strain point of 600° C. or higher. In this event, highly excellent heat resistance of the mirror base member can be attained, and further, the mechanical strength of the mirror base member is not lowered even if it is used at high temperatures over a long term. The reason that the mechanical strength of the mirror base member is not lowered even if it is used at high temperatures over a long term is as follows.

As described above, the ion exchange method is a method, wherein, by replacing alkali metal ions (Li, Na) in the glass with alkali metal ions having a greater ion radius in a molten salt, a compressive stress layer is generated in a depth of several tens of microns (for example, about 20 to 30 $\mu$m) from the glass surface, thereby to enhance the strength. However, even after the glass has been subjected to the ion exchange, if the glass is used at a temperature higher than a strain point thereof, a compressive stress in the glass surface is gradually relaxed so that the strength of the glass tends to be lowered. In general, the mirror base member is used in a temperature range of about 500 to 600° C. Accordingly, if the glass member having a strain point of 600° C. or higher is used, the compressive stress is reluctant to be relaxed even when it is used over a long term, so that the lowering of the mechanical strength can be suppressed. Preferably, the strain point of the glass is 620° C. or higher, and more preferably, 630° C. or higher.

Figure 3:
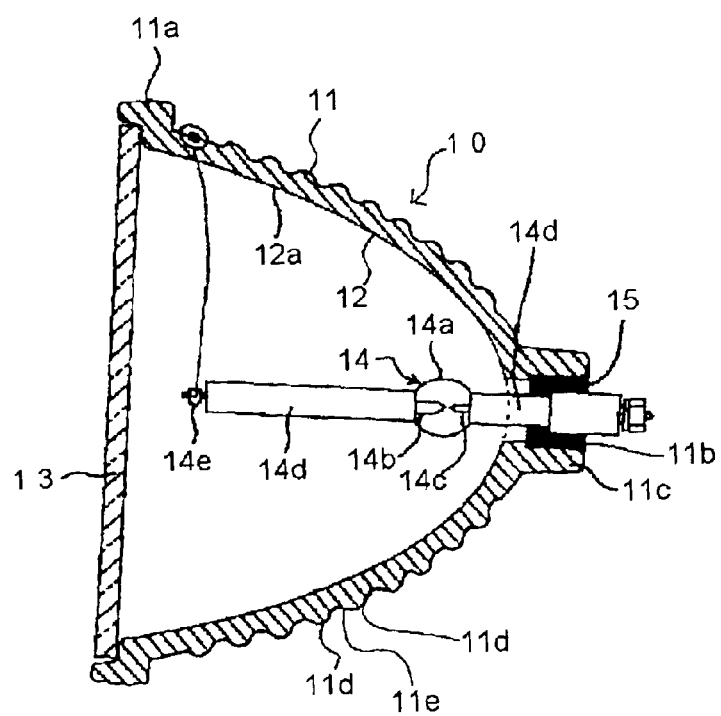
FIG. 3 is a schematic sectional view of a light source device provided with a reflector according to another embodiment of the present invention.

Referring now to FIG. 3, a light source device having a reflector according to another embodiment of the present invention will be described. The same components or portions as those shown in FIG. 1 will be assigned the same reference symbols, thereby to omit explanation thereof.

When the reflector 10 is processed or conveyed, it is possible that the outer surface, i.e. the back side, of the mirror base member 11 is subjected to formation of a small disfigurement through contact with other members. If such a disfigurement exists, a stress is concentrated to a location of the disfigurement when the reflector 10 is heated, resulting in a possibility of breakage of the mirror base member 11 starting from that location.

For preventing the breakage, it is effective to form the back side of the mirror base member 11 in a concavo-convex fashion (in FIG. 3, a convex portion is represented by 11d, while a concave portion is represented by 11e). When the back side of the mirror base member 11 is formed in a concavo-convex fashion, even if the back side abuts upon another member, a disfigurement is formed only on the convex portions 11d, and is unlikely to be formed on the concave portions 11e being valleys between the convex portions 11d. When the reflector 10 is heated, a stress tends to be concentrated to the concave portions 11e. However, a disfigurement is unlikely to be formed on the concave portions 11e, so that concentration of the stress to the disfigurement can be prevented.

The size and number of the convex and concave portions 11d and 11e may be designed properly such that when the back side of the mirror base member 11 abuts upon another member, a disfigurement is formed only on the convex portions 11d and not formed on the concave portions 11e. Accordingly, the back side of the mirror base member 11 may be formed such that, for example, the center line average height (Ra) in JIS B0601 is 10 $\mu$m or greater, and preferably, 100 $\mu$m or greater. The convex and concave portions 11d and 11e may be formed over the entire back side of the mirror base member, or only at those portions that tend to abut upon another member.

As a material of the glass member, aluminosilicate glass, borosilicate glass or crystallized glass is suitable, but the best is aluminosilicate glass. As compared with borosilicate glass, aluminosilicate glass is excellent in heat resistance and is liable to be increased in its strength by ion exchange. More specifically, aluminosilicate glass preferably has a composition of 50 to 80 mass % of $SiO_2$, 5 to 35 mass % of $Al_2O_3$ and 0.5 to 15 mass % of $Li_2O+Na_2O$.

The reason for limiting the composition of aluminosilicate glass as noted above is as follows.

$SiO_2$ is a component serving to form a network of the glass. The content of $SiO_2$ falls within a range of 50 to 80 mass %, preferably, within a range of 55 to 75 mass %, and more preferably, within a range of 60 to 72 mass %. If the content of $SiO_2$ is less than 50 mass %, the strain point is lowered, while the thermal expansion coefficient becomes extremely large, so that the heat/impact resistance is lowered. If the content of $SiO_2$ is greater than 80 mass %, melting of the glass is made difficult.

$Al_2O_3$ is a component also serving to form a network of the glass, and further serving to facilitate ion exchange. The content of $Al_2O_3$ falls within a range of 5 to 35 mass %, preferably, within a range of 10 to 30 mass %, and more preferably, within a range of 12 to 28 mass %. If the content of $Al_2O_3$ is less than 5 mass %, it is difficult to obtain the foregoing effects, and further, the strain point is lowered and the glass is liable to be devitrified. If the content of $Al_2O_3$ is greater than 35 mass %, the viscosity of the glass becomes extremely great so that melting of the glass is made difficult.

$Li_2O$ and $Na_2O$ are components serving to adjust the viscosity of the glass, while replaced in ion exchange. The total content of $Li_2O$ and $Na_2O$ falls within a range of 0.5 to 15 mass %, preferably, within a range of 1 to 10 mass %, and more preferably, within a range of 3 to 8 mass %. If the total content of $Li_2O$ and $Na_2O$ is less than 0.5 mass %, sufficient strength can not be attained even after execution of the ion exchange. If the total content of $Li_2O$ and $Na_2O$ is greater than 15 mass %, the glass is liable to be devitrified. Particularly, when $Li_2O$ in the glass is replaced with $Na_2O$ in the ion exchange, the strength is liable to be improved. Thus, it is desirable to contain 1 to 7 mass % of $Li_2O$.

Other than the foregoing components, the glass can also contain $K_2O$, $MgO$, $CaO$, $ZnO$, $BaO$, $B_2O_3$, $TiO_2$, $ZrO_2$, $P_2O_5$ and the like up to 10 mass %, respectively, and a fining agent up to 2 mass % for the purpose of adjusting the viscosity, thermal expansion coefficient, devitrification property, melting property and the like. In particular, glass having a composition of 60 to 72 mass % of $SiO_2$, 12 to 28 mass % of $Al_2O_3$, 1 to 7 mass % of $Li_{2O}$, 0 to 5 mass % of Na$_2$O, 0 to 5 mass % of K$_2$O, 0 to 5 mass % of MgO, 0 to 5 mass % of ZnO, 0 to 8 mass % of BaO, 0 to 8 mass % of TiO$_2$, 0 to 7 mass % of ZrO$_2$, 0 to 7 mass % of P$_2$O$_5$ and 0 to 2 mass % of a fining agent is desirable because the productivity of such glass is excellent. As a fining agent, As$_2$O$_3$, Sb$_2$O$_3$, SnO$_2$, Cl or the like may be used alone, or a plurality of them may be properly combined. On the other hand, it is better not to use As$_2$O$_3$ in view of environment because it is harmful.

On the other hand, borosilicate glass preferably has a composition of 70 to 85 mass % of SiO$_2$, 5 to 18 mass % of B$_2$O$_3$, 1 to 5 mass % of Al$_2$O$_3$ and 3 to 10 mass % of Li$_2$O+Na$_2$O, and the average thermal expansion coefficient thereof in a temperature range of 30 to 380° C. is preferably $40 \times 10^{-7}/°$ C. or less.

The reason for limiting the composition of borosilicate glass as noted above is as follows. If the content of SiO$_2$ is less than 70 mass %, the thermal expansion coefficient is increased, while the heat resistance is lowered. On the other hand, if the content of SiO$_2$ is greater than 85 mass %, the melting property of the glass is lowered. If the content of B$_2$O$_3$ is less than 5 mass %, the melting property of the glass is lowered, and if it is greater than 18 mass %, the chemical durability is lowered so that the glass becomes unstable. If the content of Al$_2$O$_3$ is less than 1 mass %, the chemical durability is lowered so that the glass becomes unstable, and if it is greater than 5 mass %, the melting property of the glass is lowered. If the total content of Li$_2$O and Na$_2$O is less than 3 mass %, the melting property of the glass is lowered and the strengthening by the ion exchange is made difficult, and if it is greater than 10 mass %, the thermal expansion coefficient is increased and the heat resistance tends to be lowered. As additional components, Cl$_2$, F$_2$, Sb$_2$O$_3$, As$_2$O$_3$, Bi$_2$O$_3$, CaO, ZrO$_2$ and the like may be contained up to 3 mass % in the total content thereof.

On the other hand, crystallized glass preferably has a composition of 55 to 80 mass % of SiO$_2$, 15 to 30 mass % of Al$_2$O$_3$, 1 to 10 mass % of Li$_2$O+Na$_2$O, 0 to 10 mass % of K$_2$O, 0.5 to 5 mass % of MgO+CaO+BaO+ZnO, 0.5 to 10 mass % of TiO$_2$+ZrO$_2$+P$_2$O$_5$ and 0 to 2 mass % of As$_2$O$_3$+Sb$_2$O$_3$, and precipitates β-quartz solid solution crystal or β-Spodumene crystal through a heat treatment, and the average thermal expansion coefficient in a temperature range of 30 to 380° C. preferably falls within a range of $-10 \times 10^{-7}$ to $25 \times 10^{-7}/°$ C.

The reason for limiting the composition of crystallized glass as noted above is as follows. If the content of SiO$_2$ is less than 55 mass %, the glass is liable to be devitrified, and if it is greater than 80 mass %, melting of the glass is made difficult. If the content of Al$_2$O$_3$ is less than 15 mass %, the thermal expansion coefficient is increased and the heat resistance is lowered, and if it is greater than 30 mass %, melting of the glass is made difficult. If the total content of Li$_2$O and Na$_2$O is less than 1 mass %, the melting property of the glass is lowered and the strengthening by the ion exchange is made difficult. If the total content of Li$_2$O and Na$_2$O is greater than 10 mass %, or if the content of K$_2$O is greater than 10 mass %, the thermal expansion coefficient is increased and the heat resistance is lowered. If the total content of MaO, CaO, BaO and ZnO is less than 0.5 mass %, melting of the glass is made difficult, and if it is greater than 5 mass %, the thermal expansion coefficient is increased and the heat resistance is lowered. TiO$_2$, ZrO$_2$ and P$_2$O$_5$ act as nucleus forming agents. If the total content of these components is less than 0.5 mass %, crystallization is made difficult, and if it is greater than 10 mass %, melting of the glass is made difficult. As$_2$O$_3$ and Sb$_2$O$_3$ act as fining agents and can be added up to 2 mass %.

The mirror base member 11 of the reflector 10 of each of the light source devices shown in FIGS. 1 and 3 is formed into an approximately bowl shape by a press molding method. If the surface roughness (Ra) of the concave surface on the front side of the mirror base member 11 after the formation thereof is 0.05 μm or greater, irregular reflection of light is caused and the chemical solution used for the ion exchange remains, so that the film formability tends to be lowered. In this event, therefore, it is necessary to polish the surface to render the surface roughness (Ra) less than 0.05 μm, preferably, 0.03 μm or less.

The protective glass plate 13 is sealingly attached to the front side of the mirror base member 11 using glass frit of a low melting point. The protective glass plate 13 is preferably made of the same material as that of the mirror base member 11 for achieving an excellent sealing state. Further, an antireflection film is preferably formed on one side or each of both sides of the protective glass plate 13. With this arrangement, reflection of light, which has been radiated from the light source lamp 14, on the surface of the protective glass plate 13 can be suppressed so that a high-intensity projecting or lighting device can be obtained. The antireflection film also functions to suppress lowering of the strength and transmittance of the protective glass plate 13. For example, if the ion-exchanged protective glass plate 13 is exposed at high temperatures over a long term, alkali metal ions in the glass are gradually replaced with water in the air, so that the protective glass plate 13 tends to be lowered in its mechanical strength and further tends to be cloudy. On the other hand, if the antireflection film is formed on the surface of the protective glass plate 13, it will serve as a barrier layer to prevent an occurrence of replacement between alkali metal ions in the glass and water in the air, so that the lowering of the mechanical strength and the generation of the cloudiness can be prevented. In view of the foregoing, it is desirable that the antireflection film is formed on each of both sides of the protective glass plate 13, rather than formed only on one side thereof.

As the foregoing antireflection film, a multilayer film that is formed by stacking high refractive index films and low refractive index films alternately in 3 to 10 layers and that has a thermal expansion coefficient of $30 \times 10^{-7}$ to $50 \times 10^{-7}/°$ C. in a temperature range of 30 to 380° C. is suitable. As a high refractive index film, a film of TiO$_2$, Ta$_2$O$_5$, Nb$_2$O$_5$ or the like is suitable. As a low refractive index film, a film of SiO$_2$, MgF$_2$ or the like is suitable. A film in the form of alternate layers of TiO$_2$ and SiO$_2$ is desirable because it is excellent in film formability and heat resistance, and in addition, it is low-cost. As a film forming method, sputtering or vacuum deposition can be used.

In the prior art, the protective glass plate is made of borosilicate glass having a thickness of about 5.0 mm. However, if the mechanical strength is enhanced, it is possible to achieve the strength equal to or greater than that of the conventional protective glass plate, with a less thickness. Further, as the thickness decreases, more reduction in size and weight of the device can be accomplished. Accordingly, the thickness is preferably set to 3.0 mm or less, and more preferably, set to 2.5 mm or less. On the other hand, if the thickness is reduced too much, it is difficult to ensure the necessary strength. Thus, the thickness should be set to 0.5 mm or greater. The protective glass plate 13 may be formed into a plate shape using a molding method such as a float method, a down draw method or a rollout method. Preferably, the surface roughness (Ra) is set to less than 0.01 μm. If the roughness of the formed surface is large, the surface may be polished to a desired roughness value.

If the visible light transmittance of the protective glass plate 13 is low, light radiated from the light source lamp 14 is reluctant to pass through the protective glass plate 13, resulting in lowering of luminance. Therefore, the protective glass plate 13 has a transmittance of, preferably 95% or greater, and more preferably 97% or greater, within a wavelength range of 420 to 720 nm.

Hereinbelow, further detailed explanation will be given using examples according to the present invention and comparative examples.

Table 1 shows glass compositions of a mirror base member of a reflector according to examples 1 to 3.

TABLE 1

| | Example 1 | Example 2 | (mass %) Example 3 |
|---|---|---|---|
| $SiO_2$ | 66% | 79% | 66% |
| $Al_2O_3$ | 22% | 3% | 22% |
| $Li_2O$ | 4% | — | 4% |
| $Na_2O$ | 0.5% | 4.5% | 0.5% |
| $K_2O$ | 0.5% | — | 0.5% |
| $TiO_2$ | 2% | — | 2% |
| $ZrO_2$ | 2% | — | 2% |
| $P_2O_5$ | 1.5% | — | 1.5% |
| BaO | 0.5% | — | 0.5% |
| $B_2O_3$ | — | 13.5% | — |
| $Sb_2O_3$ | 1% | — | 1% |
| kind of glass | aluminosilicate glass | borosilicate glass | crystallized glass |

Each of examples 1 and 2 given in Table 1 was prepared in the following manner. First, a material adjusted to have the glass composition of each of examples 1 and 2 defined in Table 1 was put into a platinum crucible and melted in an electric furnace at approximately 1580° C. Thereafter, the molten glass was poured into a die, then, press working was carried out to form a glass mirror base member having an approximately bowl shape with a rectangular opening, and then processing is performed to form a lamp mounting hole in the glass mirror base member. Subsequently, the glass mirror base member was immersed in a tub of $KNO_3$ (potassium nitrate) held to 500° C., for 6 hours.

With respect to the glass mirror base member of example 1 thus obtained, the average thermal expansion coefficient in a temperature range of 30 to 380° C. was $43 \times 10^{-7}/°$ C., and a strong compressive stress layer was formed in the surface thereof. Thereafter, on a concave surface (reflecting surface) of the glass mirror base member, a reflecting film in the form of alternate 40 layers of $TiO_2$ and $SiO_2$ was formed by vacuum deposition.

With respect to the glass mirror base member of example 2 thus obtained, the average thermal expansion coefficient in a temperature range of 30 to 380° C. was $33 \times 10^{-7}/°$ C., and a strong compressive stress layer was formed in the surface thereof. Thereafter, on a concave surface of the glass mirror base member, a reflecting film in the form of alternate 40 layers of $TiO_2$ and $SiO_2$ was formed by vacuum deposition.

Example 3 given in Table 1 was prepared in the following manner. First, a material adjusted to have the glass composition of example 3 defined in Table 1 was put into a platinum crucible and melted in an electric furnace at approximately 1600° C. Thereafter, the molten glass was poured into a die, then, press working was carried out to form a glass mirror base member having an approximately bowl shape with a rectangular opening, and then processing is performed to form a lamp mounting hole in the glass mirror base member. Subsequently, the glass mirror base member was put into an electric furnace where it was subjected to a heat treatment according to a temperature schedule including a nucleus forming process at 780° C. for 2 hours and a crystal growing process at 1160° C. for 1 hour, thereby to achieve crystallization, and then cooled slowly. The temperature raising speed was 300° C./hour from a room temperature to a nucleus forming temperature, and 100 to 200° C./hour from the nucleus forming temperature to a crystal growing temperature. Thereafter, the glass mirror base member was immersed in a tub of $KNO_3$ (potassium nitrate) held to 500° C., for 24 hours. The glass mirror base member of example 3 thus obtained precipitated β-Spodumene solid solution as main crystals, the average thermal expansion coefficient thereof in a temperature range of 30 to 380° C. was approximately $10 \times 10^{-7}/°$ C., and a strong compressive stress layer was formed in the surface thereof. Thereafter, on a concave surface of the glass mirror base member, a reflecting film in the form of alternate 40 layers of $TiO_2$ and $SiO_2$ was formed by vacuum deposition.

Table 2 shows compositions, thermal expansion coefficients, strain points, and dropping heights upon destruction in a drop strength test, with respect to protective glass plates according to example 4 and comparative examples 1 and 2.

TABLE 2

| | Example 4 | Comparative Example 1 | (mass%) Comparative Example 2 |
|---|---|---|---|
| $SiO_2$ | 66% | 66% | 81% |
| $Al_2O_3$ | 22% | 22% | 2% |
| $Li_2O$ | 4% | 4% | — |
| $Na_2O$ | 0.5% | 0.5% | 3.5% |
| $K_2O$ | 0.5% | 0.5% | 0.5% |
| $TiO_2$ | 2% | 2% | — |
| $ZrO_2$ | 2% | 2% | — |
| $P_2O_5$ | 1.5% | 1.5% | — |
| BaO | 0.5% | 0.5% | — |
| $Sb_2O_3$ | 1% | 1% | — |
| $B_2O_3$ | — | — | 13% |
| ion exchange process | done | none | none |
| thermal expansion coefficient ($\times 10^{-7}/°$ C.) | 43 | 43 | 32 |
| strain point | 640° C. | 640° C. | 500° C. |
| dropping height upon destruction | 60 cm | 10 cm | 10 cm |

A protective glass plate of example 4 given in Table 2 was prepared in the following manner.

First, a material adjusted to have the glass composition of example 4 defined in Table 2 was put into a platinum crucible and melted in an electric furnace at approximately 1580° C., then subjected to roll forming to be formed into a plate having a thickness of 2 mm, and then cut into a rectangular glass plate having a size of about 60×65 mm.

Thereafter, the glass plate was immersed in a tub of $KNO_3$ (potassium nitrate) held to 500° C., for 6 hours, to carry out an ion exchange process, so that a strong compressive stress layer was formed in the surface of the glass plate. Then, on each of both sides of the glass plate, an antireflection film in the form of alternate 8 layers of $TiO_2$ and $SiO_2$ was formed by sputtering.

With respect to a protective glass plate of comparative example 1, a rectangular glass plate was formed in the same manner as example 4, then, without performing an ion exchange process, an antireflection film in the form of alternate 8 layers of TiO$_2$ and SiO$_2$ was formed by sputtering on each of both sides of the glass plate.

With respect to a protective glass plate of comparative example 2, a material adjusted to have the glass composition of comparative example 2 defined in Table 2 was put into a platinum crucible and melted in an electric furnace at approximately 1550° C., then subjected to roll forming to be formed into a plate having a thickness of 5 mm, and then cut into a rectangular glass plate having a size of about 60×65 mm. Thereafter, without performing an ion exchange process, an antireflection film in the form of alternate 8 layers of TiO$_2$ and SiO$_2$ was formed by sputtering on each of both sides of the glass plate.

The protective glass plates of example 4 and comparative examples 1 and 2 thus obtained were subjected to a drop strength test. In this test, a conical deadweight (200 g) with a round tip was dropped onto the glass plate, and a dropping height was started from 10 cm and then increased per 10 cm. As a result, the protective glass plates of comparative examples 1 and 2 were both broken when the deadweight was dropped from the initial height of 10 cm. On the other hand, the protective glass plate of example 4 was broken when the deadweight was dropped from the height of 60 cm.

The foregoing drop strength test was also applied to the protective glass plate of example 4 after it had been heated at 50° C. for 1 hour in an electric furnace and then taken out from the electric furnace. The result was that the protective glass plate was broken when the deadweight was dropped from the height of 60 cm.

Figure 4:
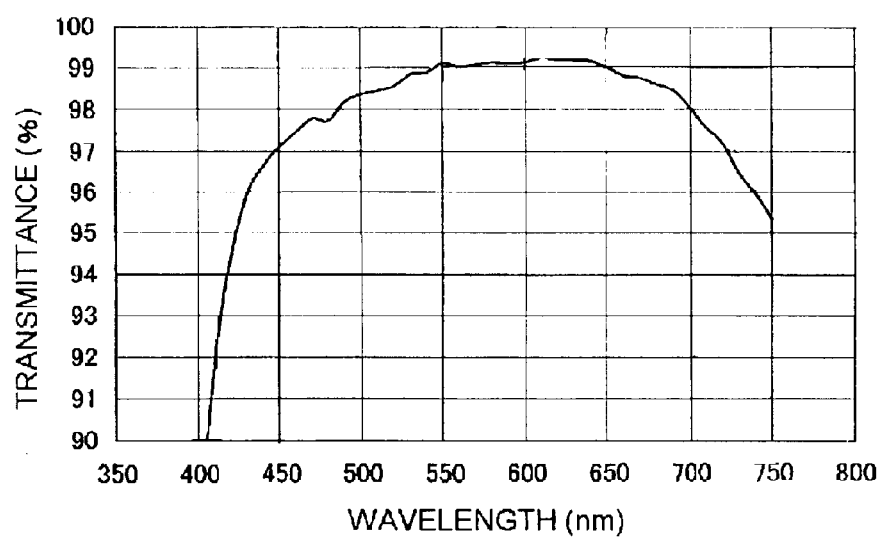
FIG. 4 is a graph showing a visible light transmittance curve of a protective glass plate incorporated in the reflector shown in FIG. 1.

Further, after the protected glass plate of example 4 was heated under the same condition as noted above, its visible light transmittance was measured using a spectrophotometer. The result is shown in FIG. 4. As seen from FIG. 4, the protective glass plate had a transmittance of 95% or greater within a wavelength range of 420 to 720 nm.

From the foregoing, it is understood that the protective glass plate of example 4 has the enhanced mechanical strength because it has been subjected to ion exchange, and can prevent lowering of the strength and transmittance of the glass plate even if subjected to heating, because the antireflection films are formed on both sides thereof.

By attaching the protective glass plates of example 4 shown in Table 2 to the mirror base members of examples 1 to 3 shown in Table 1, light source devices were produced in total of 60 including 20 light source devices for each of three combinations. With respect to light source lamps of those light source devices, a heat cycle test was conducted wherein 50 cycles were repeated each including 1 hour energization and 20 minute interruption. Thereafter, the states of the protective glass plates and the mirror base members were observed. The result was that no cracks were observed with respect to any of the protective glass plates or the mirror base members of all the light source devices.

For comparison, by using mirror base members each made of the same glass material as that of example 1 and each not subjected to an ion exchange process, and the protective glass plates of comparative example 1 shown in Table 2, 20 light source devices were produced and subjected to the foregoing heat cycle test. The result was that cracks were caused with respect to the mirror base members and the protective glass plates of 5 light source devices.

Further, when the light source lamps were forcibly burst up, no breakage was caused with respect to the mirror base members or the protective glass plates of the light source devices according to examples 1 to 4, while breakage was caused with respect to the mirror base members or the protective glass plates of the light source devices according to comparative examples 1 and 2 due to fragments of the broken lamps, and those fragments were scattered around.

What is claimed is:

1. A reflector comprising:
   a mirror base member having concave surface;
   a reflecting film formed on said concave surface; and
   a protective glass plate attached to said mirror base member for preventing a fragments of a broken lamp from flying forward, at least one of said mirror base member and said protective glass plate being made of a glass member whose mechanical strength is enhanced by subjecting a surface layer of said glass member to compressive stress by ion exchange.

2. The reflecter according to claim 1, wherein said reflecting film is formed in a multilayer fashion.

3. The reflecter according to claim 1, wherein said concave surface forms a curved surface.

4. The reflecter according to claim 1, wherein said protective glass plate is connected to said mirror base member at a peripheral portion of said concave surface.

5. The reflecter according to claim 1, wherein said glass member is made of one selected from aluminosilicate glass, borosilicate glass and crystallized glass.

6. The reflecter according to claim 1, wherein said glass member has a strain point of 600° C. or higher.

7. The reflecter according to claim 1, wherein said glass member has a thermal expansion coefficient of $5 \times 10^{-7}$ to $60 \times 10^{-7}$/° C. in a temperature range of 30 to 380° C.

8. The reflecter according to claim 1, wherein said glass member has a composition of 50 to 80 mass % of SiO$_2$, 5 to 35 mass % of Al$_2$O; and 0.5 to 15 mass % of Li$_2$O+Na$_2$O.

9. The reflecter according to claim 1, wherein said mirror base member has a back side which faces opposite to said concave surface is formed in a concavo-convex fashion.

10. The reflecter according to claim 9, wherein said back side is formed such that a center line average height in JIS B0601 is 10 μm or greater.

11. The reflecter according to claim 1, wherein said protective glass plate is formed with an antireflection film on at least one of its opposite sides.

12. The reflecter according to claim 1, wherein said protective glass plate has a thickness of 3.0 mm or less.

13. The reflecter according to claim 1, wherein said protective glass plate has a transmittance of 95% or greater within a wavelength range of 420 to 720 nm.

14. A reflector comprising:
   a mirror base member having a concave surface; and
   a reflecting film formed on said concave surface, said mirror base member being made of a glass member and having a back side which face opposite to said concave surface and is formed in a concavo-convex fashion.

15. The reflecter according to claim 14, wherein said mirror base member is provided at its center with a lamp mounting hole for mounting a light source lamp.

16. The reflecter according to claim 14, wherein said reflecting film is formed in a multilayer fashion.

17. The reflecter according to claim 14, wherein said back side is formed such that a center line average height in JIS B0601 is 10 μm or greater.

18. The reflecter according to claim 14, wherein said glass member has mechanical strength enhanced.

\* \* \* \* \*